(12) United States Patent
Beck et al.

(10) Patent No.: US 6,447,870 B1
(45) Date of Patent: Sep. 10, 2002

(54) OPTICAL STORAGE DISK BLANK AND METHOD FOR MANUFACTURING THE DISK BLANK

(75) Inventors: Herbert Beck, Paderborn; Gerhard Schulz, Rietberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,130

(22) PCT Filed: Aug. 13, 1998

(86) PCT No.: PCT/DE98/02353

§ 371 (c)(1),
(2), (4) Date: Mar. 23, 2000

(87) PCT Pub. No.: WO99/16062

PCT Pub. Date: Apr. 1, 1999

(30) Foreign Application Priority Data

Sep. 24, 1997 (DE) .......................... 197 42 150

(51) Int. Cl.⁷ .......................... B32B 3/02; B32B 31/00; G11B 3/70; G03C 1/76
(52) U.S. Cl. .................. 428/64.4; 428/64.1; 369/288; 156/275.3; 430/270.1
(58) Field of Search .............. 428/64.4, 64.1; 369/288; 156/275.3; 430/270.1

(56) References Cited

U.S. PATENT DOCUMENTS

| 4,726,008 A | * | 2/1988 | Renaud ...................... 369/286 |
| 4,764,931 A | * | 8/1988 | Matsuda ...................... 372/29 |
| 4,990,208 A | * | 2/1991 | Kano ...................... 156/275.3 |
| 5,016,240 A | * | 5/1991 | Strandjord et al. .......... 369/288 |
| 5,513,169 A | * | 4/1996 | Fite et al. .................... 369/272 |
| 5,578,415 A | * | 11/1996 | Hayashi et al. ........ 430/270.11 |
| 5,730,922 A | * | 3/1998 | Babb et al. .................. 264/258 |

FOREIGN PATENT DOCUMENTS

| DE | 295 12 188 | 9/1995 |
| DE | 94 21 869 | 2/1997 |
| DE | 196 07 565 | 7/1997 |
| EP | 0 514 799 | 11/1992 |
| EP | 0 628 956 | 12/1994 |
| WO | WO 97/04450 | 2/1997 |

\* cited by examiner

Primary Examiner—Cynthia H. Kelly
Assistant Examiner—L. Ferguson
(74) Attorney, Agent, or Firm—Schiff Hardin & Waite

(57) ABSTRACT

Method for manufacturing an optically readable digital storage disk having an arbitrary edge contour from a CD-R disk blank, as well as a CD-R disk blank suitable for the manufacture of a storage disk, starts with a blank having a plastic disk that is provided with a reflective layer on the side opposite a scanning side. The reflective layer, which is connected with the plastic disk along a first line, is welded with the plastic disk along an arbitrarily shaped second line that is closed on itself. Afterwards, the storage disk is cut from the CD-R disk blank along a third line that corresponds to the edge contour.

20 Claims, 1 Drawing Sheet

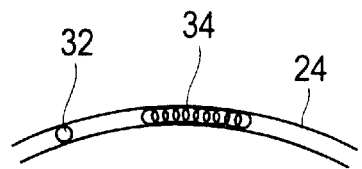
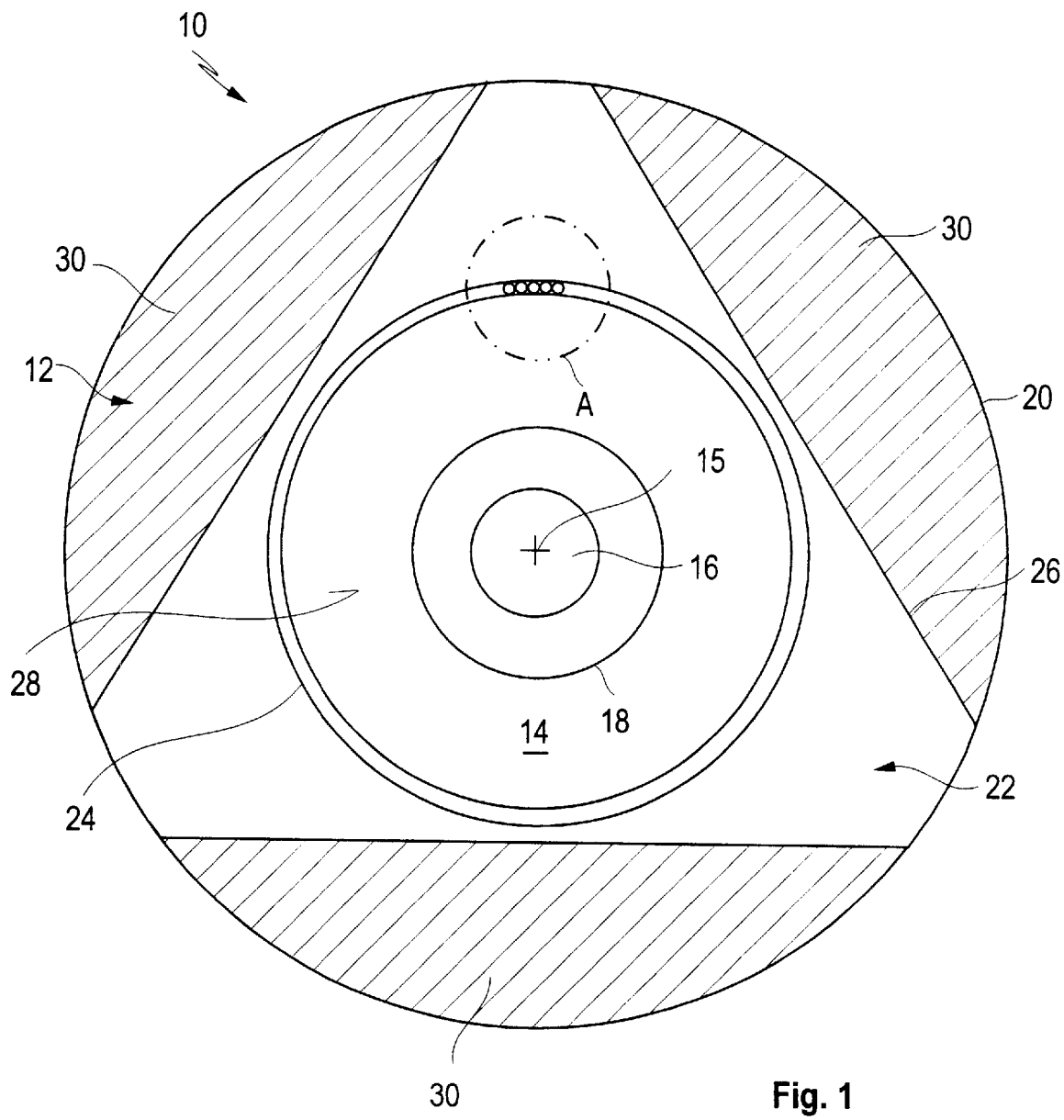

OPTICAL STORAGE DISK BLANK AND METHOD FOR MANUFACTURING THE DISK BLANK

BACKGROUND OF THE INVENTION

The invention relates to a method for manufacturing an optically readable digital storage disk from a CD-R disk blank consisting of a plastic disk that is provided, on the side opposite a scanning side, with a reflective layer that lies loosely on the plastic disk, and the reflective layer is connected with the plastic disk along a first line that surrounds an axis of rotation of the storage disk, and a CD-R disk blank suitable for the manufacture thereof.

A method for manufacturing such a storage disk from a CD storage disk that bears on one side a metal layer and a layer of protective paint above it, and has an edge that deviates at least partially from a circle, is already known from DE-U-295 12 188. A disk of this type is a storage disk of the compact disk type, provided with items of information using pressing technology. The information is hereby pressed into the surface of the plastic disk, and this disk is then coated with a reflective metal layer. The layer of paint serves to protect the very thin metal layer that bears the information. The plastic disk is connected over its entire surface with the metal layer, and this layer is in turn connected over its whole surface on the inside with the layer of paint, so that given a form cut there is only the problem of the penetration of moisture into the open edge of the cut.

Otherwise, it behaves like a writeable optical storage disk, known as a CD-R (Recordable Compact Disk) or also CD-WO (Compact Disk—Write Once). As is known, this disk is constructed in such a way that a transparent layer of pigment is applied to a plastic disk, and this layer of pigment is in turn coated with a reflective layer. During the writing of information, the layer of pigment is heated in punctiform fashion, and thereby changes color while forming a small bubble. The reflective layer is raised slightly over this. For this reason, the reflective layer is connected with the plastic disk along a first line that surrounds the axis of rotation and along another line that surrounds this first line. Between these lines, the reflective layer lies loosely on the layer of pigment that bears the information. A simple form cut, as in the case of a CD, would thus cause the complete destruction of the reflective layer, even over the surface area bearing the information, so that the disk would no longer be readable.

EP-A-0 628 956 discloses a CD-R disk blank and a method for the manufacture thereof. The disk blank is composed of a plastic disk that is provided with a reflection layer lying loosely on the plastic disk at that side lying opposite a scan side, and the reflection layer is connected to the plastic disk along a first line concentrically surrounding a rotational axis of the storage disk and along a second line that proceeds concentrically outside the first line as viewed from the rotational axis. The plastic disk is only partially coated with the reflection layer.

SUMMARY OF THE INVENTION

It is thus the object of the invention to indicate a method for manufacturing an optically readable digital storage disk of the CD-R type, and such a storage disk that is manufactured from a CD-R disk blank.

The object relating to a method is achieved by means of the method steps of providing a CD-R blank having a plastic disk with a reflective layer lying loosely on one surface of the plastic disk, connecting the reflective layer to the plastic disk along both a first line and a second line that are each closed on itself and surround the axis of rotation with the second line being radially outside of the first line, then cutting the storage disk from the blank along a third line that corresponds to an edge contour which runs outside of the second line relative to the axis of rotation.

The storage disk is a CD-R disk blank which consists of a plastic disk that is provided, on a side opposite a scanning side, with a reflective layer that lies loosely on the plastic disk, and the reflective layer is connected with the plastic disk along a first line that surrounds an axis of rotation. The reflective layer is also connected with the plastic disk along a second line that is closed on itself and that, seen from the axis of rotation, runs outside the first line, and the CD-R disk blank has an edge contour corresponding to an arbitrarily shaped, third line deviating from a circular shape and arranged concentrically relative to the rotational axis, whereby the third line proceeds at that side of the second line facing away from the rotational axis.

According to the invention, the reflective layer is connected—in particular, welded—with the plastic disk along an arbitrarily shaped second line that is closed on itself and that, seen from the axis of rotation, runs outside the first line, and after this the disk is cut along a third line that corresponds to the edge contour, whereby the third line runs on the side of the second line facing away from the axis of rotation.

The reflective layer is thus connected at its edges with the plastic disk, and in addition the surface region located between the first and the second line lies loosely on the plastic disk. The storage disk can thus be written in this region without difficulty. Surface regions of the reflective layer that are located outside the second line are separated during the cutting of the contour and can easily be brushed, wiped or blown off the plastic disk.

Due to the fact that the second line can border immediately on the third line, the reflective layer is able to completely cover even an irregularly shaped storage disk. This disk thus has a corresponding appearance, even without an additionally adhered label.

Corresponding to a method feature that develops the invention, the information to be stored on the disk can be written before or after the cutting, whereby an arbitrarily long time can elapse between the individual method steps. Unwritten storage disks can thus be pre-manufactured and written with an individual item of information at an arbitrary time.

For example, "congratulation disks" can be manufactured and offered for sale in various shapes corresponding to the respective occasion, and can be written with personal information such as songs, texts, images or video clips, or also with data that can be processed by a computer, by a consumer in his or her own write apparatus, known as a CD writer.

Corresponding to another development of the invention, the connection of the reflective layer with the plastic disk takes place simultaneously with the cutting of the edge contour. By this means, an operational step is saved in the manufacturing. The information to be stored on the disk can in turn be written at an arbitrary later time.

The connection preferably takes place using punctiform overlapping laser welding, but it can also take place with the aid of a hot stamp die shaped according to the second line, by gluing or by pressing.

The contour is preferably manufactured by milling, but can also be manufactured by laser cutting, hot wire cutting or sawing.

Additional features and advantages of the invention result from the following specification, which, in connection with the accompanying drawings, explains the invention on the basis of an exemplary embodiment.

BRIEF DESCRIPTIONS OF THE DRAWINGS

FIG. 1 shows a CD-R blank on which the above-specified lines are indicated, and

FIG. 2 shows an enlarged segment A from FIG. 1.

DESCRIPTION OF THE PREFERRED EMBODIMENT

FIG. 1 shows a standard commercially available CD-R blank 10. It consists of a plastic disk 12, generally made of polycarbonate, having a layer of pigment applied thereon. A reflective layer 14, generally made of gold, is arranged over the layer of pigment. This layer is connected with the plastic disk 12 in the vicinity of the edge 20 of the CD-R blank 10, along a first line 18 that concentrically surrounds an axis of rotation 15 that coincides with the center of a center hole 16.

Using the inventive method, a storage disk 22 having an arbitrary edge contour can be manufactured from the CD-R blank 10. In the exemplary embodiment shown in FIG. 1, the storage disk 22 receives the shape of a triangle with flattened vertices. This shape was selected for the exemplary embodiment in order to make it clear that the original edge 20 of the CD-R blank 10 should be retained at least at some points, so that the storage disk 22 can more easily be placed into a CD writer, and later into a CD drive, in centered fashion.

First, the reflective layer 14 is welded to the plastic disk 12 along a second line 24. This line can have any curve closed on itself. It must only remain inside a third line 26 that corresponds to the later edge contour of the storage disk 22, and a concentric, and thus writeable, surface 28 that remains between the first line 18 and the second line 24 must be able to hold the quantity of information that is to be written. In the exemplary embodiment, the second line 24 concentrically surrounds the center hole 16. However, it can also run immediately on the inner side of the third line 26, or can run arbitrarily between this line and the outer boundary of the writeable surface 28.

The storage disk 22 can now either be written with information or its outer contour is cut out previously. The cutting tool, e.g. a mill, is thereby guided along the third line 26. Surface regions 30 (shown with hatching) that extend beyond this line are thereby discarded. The parts of the relatively brittle reflective layer 14 that extend beyond the second line 24 thereby break off along the second line 24.

As FIG. 2 shows in an enlarged segment A from FIG. 1, the reflective layer 24 is preferably connected with the plastic disk 12 by laser welding. This method has the advantage that the heating takes place in punctiform fashion and only on a very small surface 32. The edge region that is "ruined" for later writing by the welding thus remains small. The weld point surfaces 32 of the individual laser discharges overlap one another, so that an uninterrupted weld track 34 results.

We claim:

1. A method for manufacturing an optically readable digital storage disk having an edge contour by the steps of providing a CD-R disk blank having a circular edge and consisting of a plastic disk that is provided, on one side opposite a scanning side, with a reflective layer that lies loosely on the plastic disk, and the reflective layer being connected with the plastic disk along a first line that surrounds an axis of rotation of the storage disk; connecting the reflective layer with the plastic disk along a shaped second line that is closed on itself and that, seen from the axis of rotation, runs outside of the first line, and then cutting the storage disk from the CD-R disk blank along a third line that corresponds to the edge contour, said third line running on the side of the second line that faces away from the axis of rotation.

2. A method according to claim 1, which includes writing information on the storage disk after the step of cutting, so that a length of time can elapse between the individual method steps.

3. A method according to claim 1, which includes a step of writing the information to be stored on the storage disk before the step of cutting.

4. A method according to claim 1, wherein the step of connecting the reflective layer with the plastic disk takes place at the same time as cutting the edge contour, and the information to be stored on the disk is written at an arbitrary time thereafter.

5. A method according to claim 1, wherein the step of connecting comprises a punctiform overlapping laser welding.

6. A method according to claim 1, wherein the step of connecting uses a hot stamp die having a shape of the second line.

7. A method according to claim 1, wherein the step of connecting takes place by means of gluing.

8. A method according to claim 1, wherein the step of connecting takes place by linear pressing of the reflective layer onto the plastic disk.

9. A method according to claim 1, wherein the step of cutting comprises milling the contour.

10. A method according to claim 1, wherein the step of cutting utilizes laser cutting.

11. A method according to claim 1, wherein the step of cutting uses a hot wire cutting.

12. A method according to claim 1, wherein the step of cutting is by sawing.

13. A method according to claim 1, wherein the step of providing a CD-R disk blank provides a commercially-available writeable CD-R storage disk.

14. A method according to claim 1, wherein the second line has a shape deviating from a contour circular shape.

15. A method according to claim 1, wherein the edge contour deviates from a circular shape.

16. A method according to claim 1, which includes removing any reflective layer in an area extending between the second and third lines.

17. A CD-R disk blank consisting of a plastic disk being provided, on a side opposite a scanning side, with a reflective layer that lies loosely on the plastic disk, said reflective layer being connected with the plastic disk along a first line that surrounds an axis of rotation, the reflective layer being connected with the plastic disk along a second line that is closed on itself and that, seen from the axis of rotation, runs outside the first line, the CD-R disk blank having an edge contour corresponding to a third line having a shape deviating from a circular shape being arranged concentric relative to the axis of rotation, wherein the third line proceeds at the side of the second line facing away from the axis of rotation.

18. A CD-R disk blank according to claim 17, wherein the second line concentrically surrounds the axis of rotation.

19. A CD-R disk blank according to claim 17, wherein the second line has an arbitrary shape deviating from a concentric circular shape.

20. A CD-R disk blank according to claim 17, wherein the side opposite the scanning side is partially free of the reflective layer in an area between the second line and the edge contour.

* * * * *